United States Patent
Shigenaga et al.

(10) Patent No.: US 9,665,904 B2
(45) Date of Patent: May 30, 2017

(54) ORDER ENTRY SYSTEM AND ORDER ENTRY METHOD

(71) Applicant: PANASONIC INTELLECTUAL PROPERTY MANAGEMENT CO., LTD., Osaka (JP)

(72) Inventors: Shinichi Shigenaga, Tokyo (JP); Ryota Fujii, Fukuoka (JP); Hisahiro Tanaka, Fukuoka (JP); Koshi Tanaka, Fukuoka (JP); Akitoshi Izumi, Fukuoka (JP); Masanari Miyamoto, Fukuoka (JP); Shinichi Takayama, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/798,731

(22) Filed: Jul. 14, 2015

(65) Prior Publication Data

US 2016/0019888 A1    Jan. 21, 2016

(30) Foreign Application Priority Data

Jul. 15, 2014    (JP) ................... 2014-145374

(51) Int. Cl.
*G10L 15/26*    (2006.01)
*G06Q 20/20*    (2012.01)
(Continued)

(52) U.S. Cl.
CPC .......... *G06Q 30/0633* (2013.01); *G10L 15/26* (2013.01); *G10L 25/48* (2013.01); *H04R 3/005* (2013.01)

(58) Field of Classification Search
CPC .................................................. G10L 15/08
See application file for complete search history.

(56) References Cited

U.S. PATENT DOCUMENTS 5,758,322 A * 5/1998 Rongley .............. G06Q 20/341
                                                      704/270
6,003,015 A * 12/1999 Kang .................... G06Q 10/087
                                                      312/100

(Continued)

FOREIGN PATENT DOCUMENTS

| JP | 2004-326612 | 11/2004 |
| JP | 2008-197826 | 8/2008 |
| JP | 2011-113442 | 6/2011 |

*Primary Examiner* — Ibrahim Siddo
(74) *Attorney, Agent, or Firm* — Greenblum & Bernstein, P.L.C.

(57) ABSTRACT

There is provided an order entry system including: a first microphone that picks up speech regarding order details of a first speaker; a second microphone that picks up speech regarding the order details of a second speaker for checking the order details of the first speaker; a speech recognizer that recognizes the speech regarding the order details of the first speaker which is picked up by the first microphone and the speech regarding the order details of the second speaker which is picked up by the second microphone; and an order data output that displays on a display, a display screen of order data regarding the order details of the first speaker, including a first speech recognition result of the speech regarding the order details of the first speaker and a second speech recognition result of the speech regarding the order details of the second speaker.

9 Claims, 14 Drawing Sheets

(51) Int. Cl.
  *G06Q 30/06* (2012.01)
  *H04R 3/00* (2006.01)
  *G10L 25/48* (2013.01)

(56) References Cited

U.S. PATENT DOCUMENTS

| | | | |
|---|---|---|---|
| 6,996,460 B1* | 2/2006 | Krahnstoever | G06F 3/0304 |
| | | | 701/1 |
| 2003/0018531 A1* | 1/2003 | Mahaffy | G06Q 20/20 |
| | | | 705/16 |
| 2003/0118197 A1* | 6/2003 | Nagayasu | H04B 1/385 |
| | | | 381/74 |
| 2004/0215455 A1* | 10/2004 | Kemp | G10L 15/22 |
| | | | 704/235 |
| 2008/0255837 A1* | 10/2008 | Kahn | G10L 25/48 |
| | | | 704/235 |
| 2012/0177295 A1* | 7/2012 | Gronau | G06K 9/03 |
| | | | 382/218 |

* cited by examiner

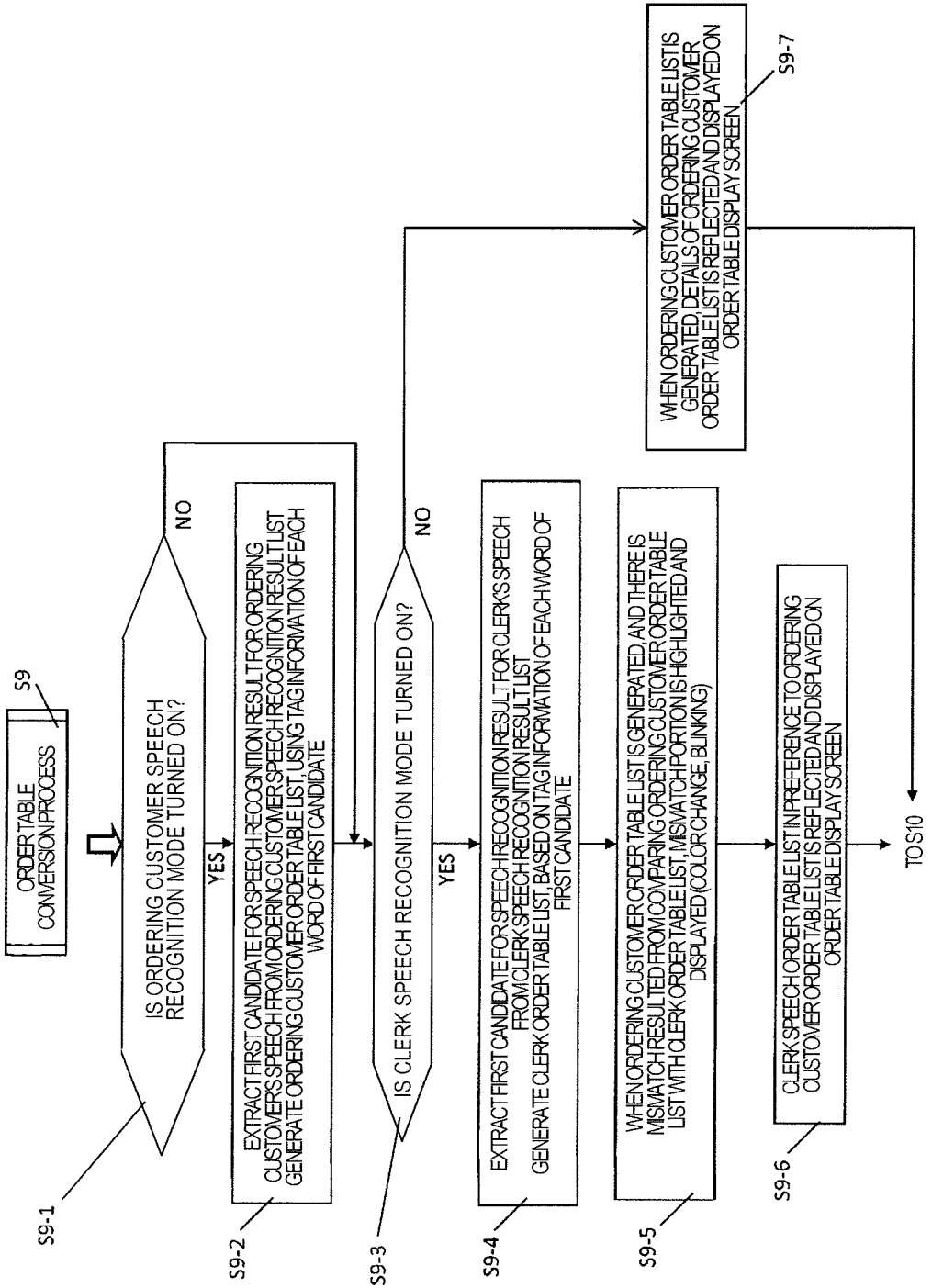

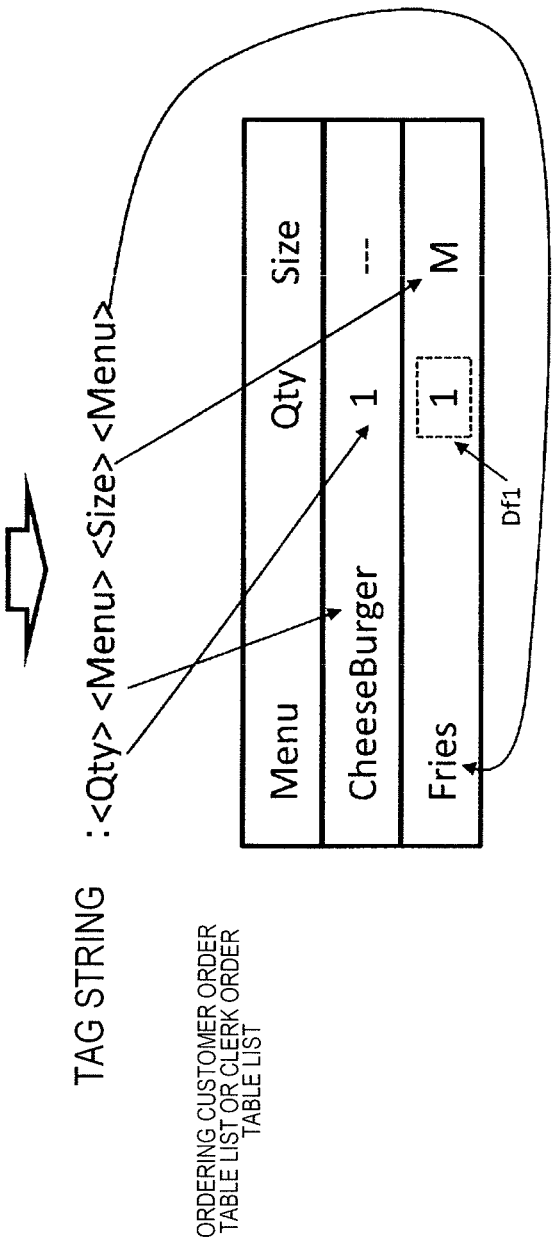

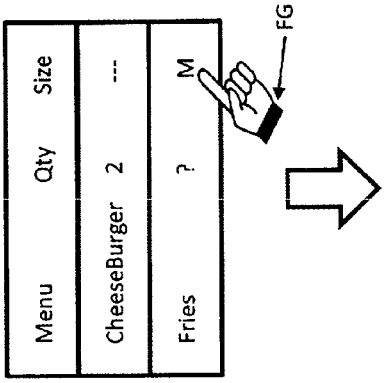
FIG. 8A
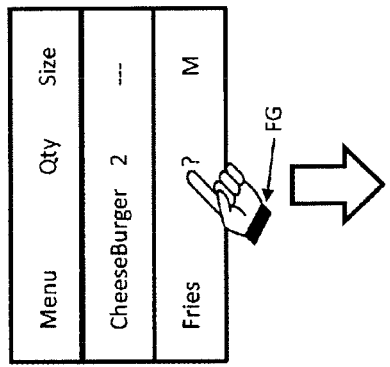
FIG. 8B
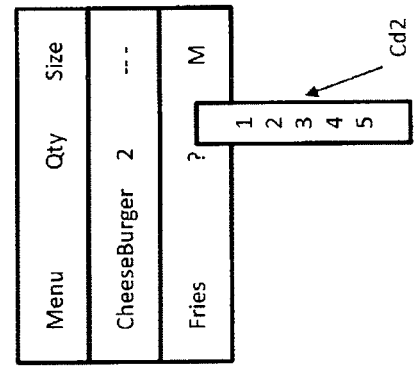
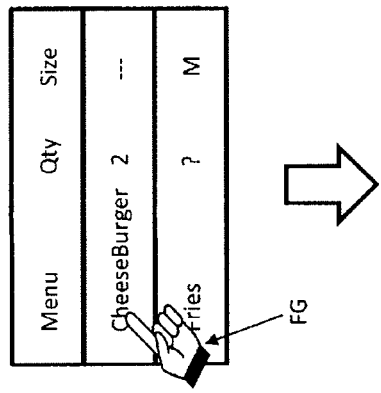
FIG. 8C
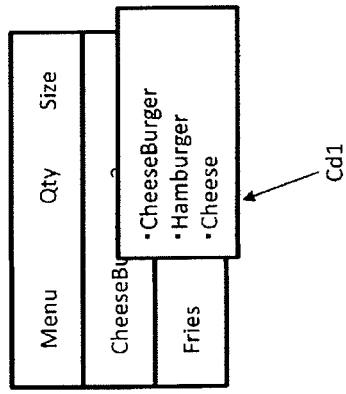

ORDER ENTRY SYSTEM AND ORDER ENTRY METHOD

BACKGROUND

1. Technical Field

The present disclosure relates to an order entry system and an order entry method, each of which recognizes speech of an ordering customer and a clerk and supports the ordering customer in inputting order details.

2. Description of the Related Art

In a drive-through of a store such as a fast food restaurant and a café, a clerk wearing a headset in the store communicates with a speaker (for example, an ordering customer) who approaches the store while driving a vehicle (for example, an automobile) for ordering, such that a microphone and a speaker are installed near a stopping position of the vehicle.

The clerk wearing a headset hears speech regarding order details that an ordering customer speaks towards an ordering customer microphone in response to speech of the clerk that is output from an ordering customer speaker, through a call system and a clerk speaker. The clerk remembers the order details such as products that the ordering customer has ordered by repeating the order details or writing a memo, and inputs the order details into a POS system by operating an input device. Data about an order table containing the order details that are input by the clerk's operation is stored in a memory, and the data about the order table is displayed on a display device.

Here, an ordering system disclosed in Japanese Patent Unexamined Publication No. 2004-326612 is proposed as the related art in which a speech order is received by a clerk, order details are transferred to each person in charge (a service representative and a cooking representative), and the order is processed, in a fast food shop or the like.

In the ordering system disclosed in Japanese Patent Unexamined Publication No. 2004-326612, a customer representative at a counter section in a store repeats a customer's order regarding food, outputs the speech picked up by a headset to an information processing terminal, and the information processing terminal performs speech recognition based on a difference between a speech signal from the headset and a noise signal picked up by a noise microphone, and outputs a speech recognition result as speech from the headset so as to cause the service representative to check the speech recognition result. The checked order is displayed on a display, and the cooking representative performs cooking while looking at the display. If the food is completed, the customer representative carries the food to a location where the customer is, and inputs the completion of the corresponding food order to a touch panel display.

Further, for example, an order data management device disclosed in Japanese Patent Unexamined Publication No. 2008-197826 is known as the related art for reducing an amount of labor required to input order details in a store.

The order data management device disclosed in Japanese Patent Unexamined Publication No. 2008-197826 receives speech information regarding a customer's order that has been picked up by a microphone, performs speech recognition, and generates and stores order data by extracting customer identification information that is contained in speech information and identifies a customer who orders a product name that is an order target and the quantity for the product name. The order data management device stores the product name in association with a unit price for the product name. Upon receiving customer identification information for specifying a customer who is to settle payment, the order data management device reads order data corresponding to the customer identification information and calculates a settlement amount, based on the product name, the quantity, and the unit price for the product, which are contained in the order data.

SUMMARY

The present disclosure provides an order entry system and an order entry method, each of which facilitates input of order details, by using two types of speech: speech of the ordering customer at the time of an order, and speech in which the clerk repeats the speech of the ordering customer at the time of the order, in a noisy environment such as a drive-through.

According to the present disclosure, there is provided an order entry system including: a first microphone that picks up speech regarding order details of a first speaker; a second microphone that picks up speech regarding the order details of a second speaker for checking the order details of the first speaker which is picked up by the first microphone; a speech recognizer that recognizes the speech regarding the order details of the first speaker which is picked up by the first microphone and the speech regarding the order details of the second speaker which is picked up by the second microphone; and an order data output that displays on a display, a display screen of order data regarding the order details of the first speaker, including a first speech recognition result of the speech regarding the order details of the first speaker and a second speech recognition result of the speech regarding the order details of the second speaker.

According to the present disclosure, there is provided an order entry method in an order entry system including a first microphone and a second microphone, including: causing the first microphone to pick up speech regarding order details of a first speaker; causing the second microphone to pick up speech regarding the order details of a second speaker for checking the order details of the first speaker which is picked up by the first microphone; recognizing speech regarding the order details of the first speaker which is picked up by the first microphone and speech regarding the order details of the second speaker which is picked up by the second microphone; and causing a display to display a display screen of order data regarding the order details of the first speaker, including a first speech recognition result of speech regarding the order details of the first speaker and a second speech recognition result of speech regarding the order details of the second speaker.

According to the present disclosure, it is possible to facilitate input of order details, by using two types of speech: speech of the ordering customer at the time of an order and speech that the clerk repeats which is the speech of the ordering customer at the time of the order, in a noisy environment such as a drive-through.

BRIEF DESCRIPTION OF DRAWINGS

FIG. 6 is a flowchart illustrating an example of an operation procedure of an order table conversion process of the order entry system of the present exemplary embodiment;

FIG. 7 is an explanatory diagram illustrating an example of a generation procedures of an ordering customer order table list or a clerk order table list;

FIG. 8A is an explanatory diagram illustrating an example of correction of order details for each item of the ordering customer order table list or the clerk order table list;

FIG. 8B is an explanatory diagram illustrating an example of correction of order details for each item of the ordering customer order table list or the clerk order table list;

FIG. 8C is an explanatory diagram illustrating an example of correction of order details for each item of the ordering customer order table list or the clerk order table list;

DETAILED DESCRIPTION OF THE PREFERRED EMBODIMENT

Hereinafter, exemplary embodiments (hereinafter, referred to as "the exemplary embodiment") of an order entry system and an order entry method according to the present disclosure will be described with reference to the drawings. The order entry system of the exemplary embodiment is described as being used in the drive-through of a store such as a fast-food restaurant or a café, but is not limited to an example of being applied to a drive-through.

The present disclosure can be realized as respective devices (for example, POS system 20 to be described later) constituting the order entry system, and a method including respective operations (steps) performed by respective devices (for example, POS system 20 to be described later) constituting the order entry system.

Figure 1:
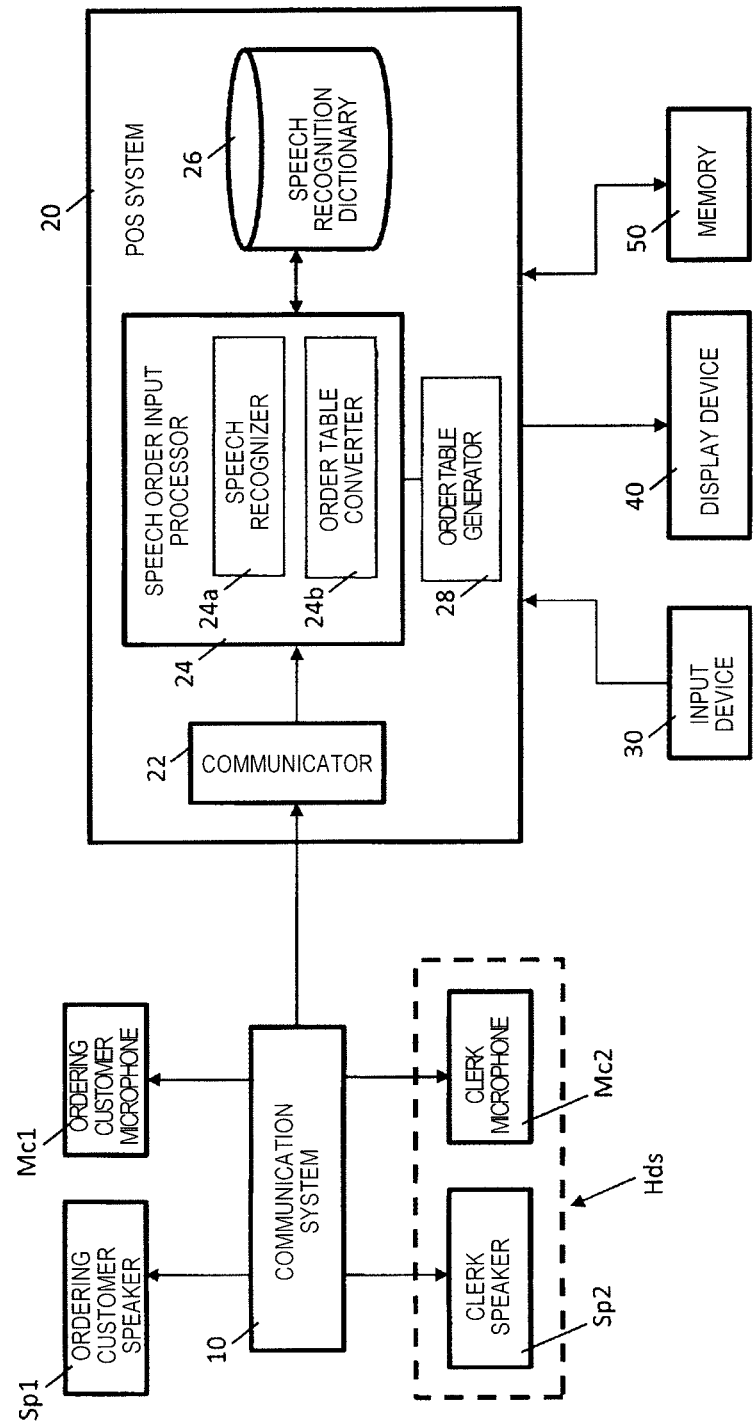
FIG. 1 is a block diagram illustrating an example of a system configuration of an order entry system of the present exemplary embodiment.

FIG. 1 is a block diagram illustrating an example of a system configuration of order entry system 100 of the exemplary embodiment. Order entry system 100 illustrated in FIG. 1 is configured to include ordering customer microphone Mc1, ordering customer speaker Sp1, clerk microphone Mc2, clerk speaker Sp2, communication system 10, POS system 20, input device 30, display device 40, and memory 50.

POS system 20 is configured to include communicator 22, speech order input processor 24, speech recognition dictionary 26, and order table generator 28, input device 30, display device 40, and memory 50 are connected to POS system 20. Clerk microphone Mc2 and clerk speaker Sp2 are configured as, for example, headset Hds that a clerk of a drive-through wears in a store.

In order entry system 100 illustrated in FIG. 1, a clerk (a second speaker, hereinafter the same) wearing headset Hds hears the speech about the order details that the ordering customer (a first speaker, hereinafter the same) speaks toward ordering customer microphone Mc1 in response to the speech of the clerk (for example, "May I help you?", "May I take your order?") that is output from ordering customer speaker Sp1, through communication system 10 and clerk speaker Sp2, and repeats the speech about the order details of the ordering customer. The speech that the clerk repeats is picked up in clerk microphone Mc2 in headset Hds. Two types of speech: speech of the ordering customer and speech that the clerk repeats are transmitted from communication system 10 to POS system 20, and the two types of speech are recognized. POS system 20 displays a display screen of order data (an order table display screen) containing order details that the ordering customer speaks on display device 40, through a predetermined process (see below) using a speech recognition result of the two types of speech.

In the present exemplary embodiment, ordering customer microphone Mc1 and ordering customer speaker Sp1 are installed in an order post (not shown) which is installed near a stopping position of the vehicle, for example, outside of the store of a drive-through. The order post is outdoor equipment that posts photographs and the like of products available to be ordered in the drive-through, and includes at least ordering customer microphone Mc1 and ordering customer speaker Sp1 which enable communication between the clerk and the ordering customer.

Ordering customer microphone Mc1, which is an example of the first microphone, picks up the speech of the ordering customer (for example, speech about the order details). The speech data about the speech that has been picked up by ordering customer microphone Mc1 is output from clerk speaker Sp2 constituting headset Hds through communication system 10.

Ordering customer speaker Sp1, which is an example of a first audio output, outputs, for example, the speech of the clerk (for example, speech about the order details). The speech of the clerk (for example, "May I help you". "Would you like to order?") is output from ordering customer speaker Sp1 through communication system 10, and is heard by an ordering customer.

Clerk microphone Mc2, which is an example of a second microphone, picks up the speech of the clerk (for example, speech about the order details that the clerk has repeated for checking the order details made by the ordering customer). The speech data about the speech that has been picked up by clerk microphone Mc2 is output from ordering customer speaker Sp1 through communication system 10.

Further, ordering customer microphone Mc1 and clerk microphone Mc2 each may be a non-directional microphone, a bi-directional microphone, a unidirectional microphone, a sharp directional microphone, a super-directional microphone (for example, a condenser microphone), or combinations thereof.

Clerk speaker Sp2, which is an example of a second audio output, outputs speech of the clerk (for example, speech about the order details that the clerk repeats for checking the order details that the ordering customer speaks). The speech of the ordering customer (for example, speech about the order details "One CheeseBurger, medium fries please" or the like) is output from clerk speaker Sp2 through communication system 10, and the clerk hears it.

Call system 10 includes an existing call control function of relaying of an audio signal between ordering customer microphone Mc1 and clerk speaker Sp2 and between clerk microphone Mc2 and ordering customer speaker Sp1, and transmits the ordering customer's speech that is picked up by ordering customer microphone Mc1 and the speech of the clerk that is picked up by clerk microphone Mc2, to POS system 20.

Call system 10 and POS system 20 are connected with each other through a network which is not shown. The network may be a wired network (for example, an intranet, and the Internet), or a wireless network (for example, a wireless local area network (LAN)).

In FIG. 1, input device 30, display device 40, and memory 50 are not respectively included in POS system 20, but may be configured to be included in POS system 20. POS system 20 may be a stationary type personal computer (PC) or a server which is installed in the back (for example, a monitoring room, not shown) of a store, or a data communication terminal, that the clerk can carry, such as a mobile phone, a tablet terminal, and a smart phone.

Communicator 22 receives an audio signal transmitted from communication system 10, and outputs the audio signal to speech order input processor 24, through a network, not shown.

Speech order input processor 24 is configured with, for example, a central processing unit (CPU), a micro processing unit (MPU) or a digital signal processor (DSP), and performs a predetermined process on the order details from the speech of the ordering customer, by using an audio signal that is output from communicator 22. Speech order input processor 24 is configured to include speech recognizer 24a and order table converter 24b.

Speech recognizer 24a performs a speech recognition process on the speech of the ordering customer (that is, speech picked up by ordering customer microphone Mc1) and the speech of the clerk (that is, speech picked up by clerk microphone Mc2), which are output from communicator 22, by using speech recognition dictionary 26.

Speech recognizer 24a stores a list including speech recognition results of a predetermined candidate number of the speech of the ordering customer as speech recognition results, and speech recognition results of a predetermined candidate number for each word included in the speech recognition results (hereinafter, referred to as "ordering customer speech recognition result list"), and a list including speech recognition results of a predetermined candidate number of the speech of the clerk, and speech recognition results of a predetermined candidate number for each word included in the speech recognition results (hereinafter, referred to as "clerk speech recognition result list"), in memory 50.

Order table converter 24b extracts speech recognition results (for example, speech recognition results having the highest speech recognition rate) for respective first candidates for the output (that is, an ordering customer speech recognition result list and a clerk speech recognition result list) from speech recognizer 24a, and generates an ordering customer order table list and a clerk order table list, based on information regarding a tag associated with each word of the speech recognition result of each first candidate so as to store the generated lists in memory 50 (see FIG. 7). FIG. 7 is an explanatory diagram illustrating a generation procedure of an example of the ordering customer order table list or the clerk order table list.

As illustrated in FIG. 7, when the first candidate for the speech recognition result in speech recognizer 24a is "One CheeseBurger, medium fries", order table converter 24b extracts a tag "Qty" corresponding to "One", a tag "Menu" corresponding to "CheeseBurger", a tag "Size" corresponding to "medium", and a tag "Menu" corresponding to "fries" from speech recognition dictionary 26, generates the ordering customer order table list or the clerk order table list which is illustrated in FIG. 7, and stores the generated list in memory 50. The ordering customer order table list is generated based on the recognition result of the speech of the ordering customer, and represents a list of order details associated with each item (tag). Similarly, the clerk order table list is generated based on the recognition result of the speech of the clerk, and represents a list of order details associated with each item (tag).

When, for example, the tag "Qty" corresponding to "fries" is missing or the speech could not be recognized, order table converter 24b gives a predetermined default value Df1 (for example, "1"). The predetermined default value is determined in advance for each item (tag).

In speech recognition dictionary 26, dictionary data used by speech recognizer 24a during the speech recognition process is stored, and for example, terms (words) which are to be subjected to the speech recognition process and tags (for example, Menu, Size, Qty: Quantity, and Price) which are items of order details for a drive-through are stored in advance in association with each other (see FIG. 5).

Figure 5:
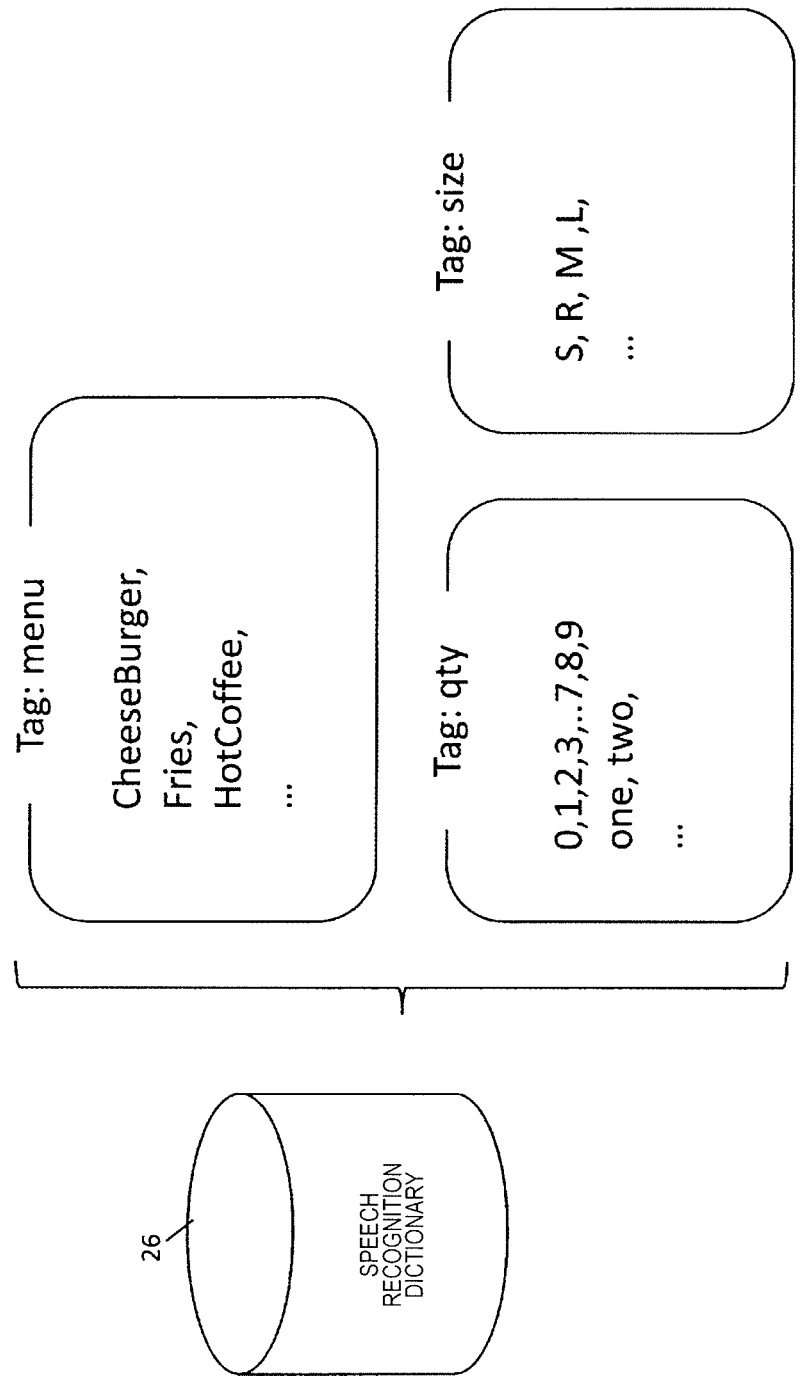
FIG. 5 is an explanatory diagram illustrating an example of a relationship between terms and tags for the respective terms, which are stored in a speech recognition dictionary.

FIG. 5 is an explanatory diagram illustrating an example of a relationship between terms and tags for respective terms which are stored in speech recognition dictionary 26.

As illustrated in FIG. 5, for example, the terms for the tag (Menu) are stored in association with the names of foods and drinks available to be ordered such as "CheeseBurger", "Fries", and "Hot Coffee", the terms for the tag (Qty) are stored in association with terms representative of the quantity such as "0", "1", "2", "3", . . . , "7", "8", "9", "one", and "two", and the terms for the tag (size) are stored in association with sizes (volumes) such as "S", "R", "M", and "L".

Figure 2:
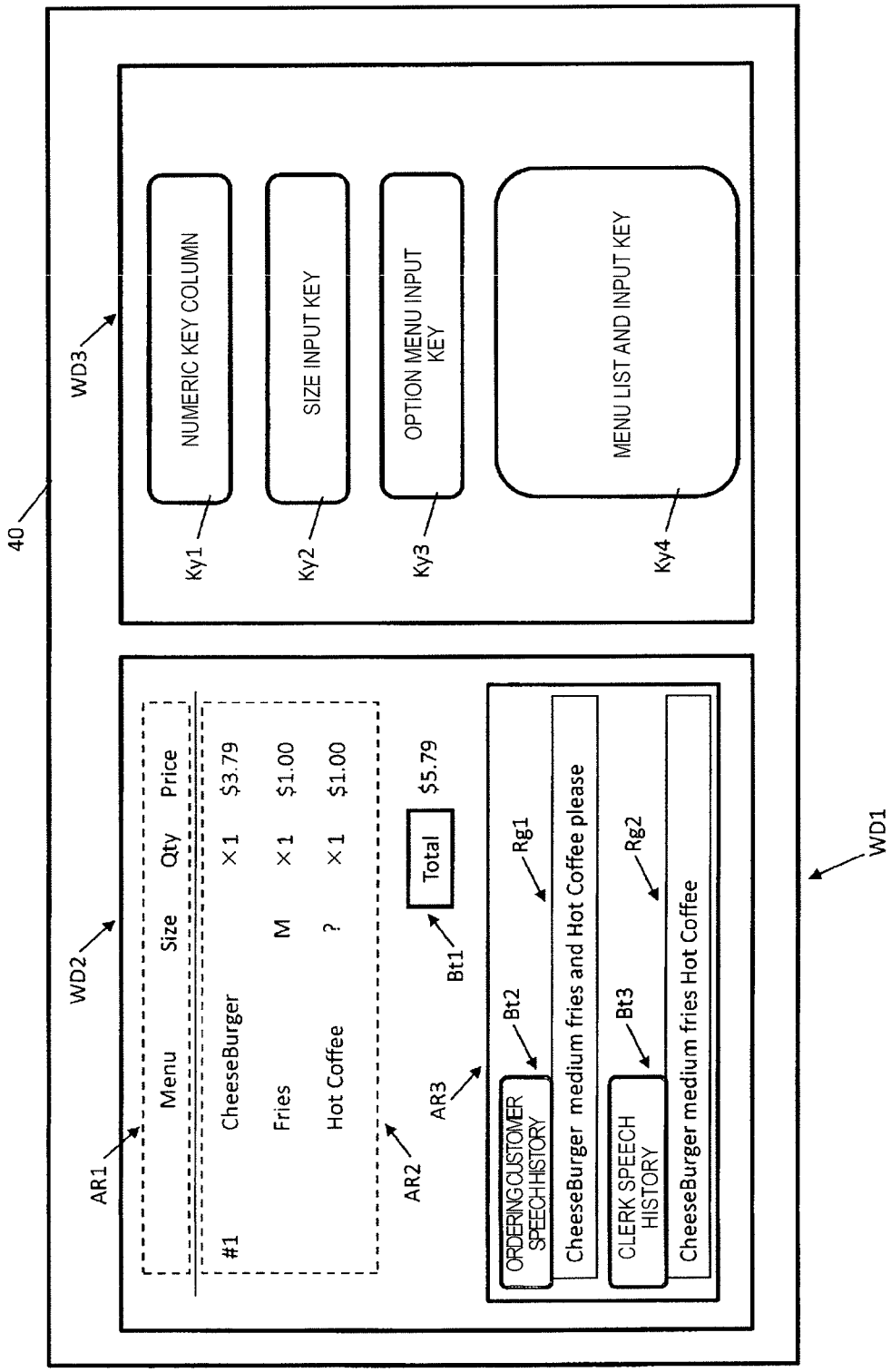
FIG. 2 is a diagram illustrating an example of an order entry screen that is generated by a POS system.

Order table generator 28, which is an example of an order data output, generates a display screen (hereinafter, referred to as "order entry screen") of the order data regarding the order details that the ordering customer speaks, by using the ordering customer order table list and the clerk order table list, which are stored in memory 50, and displays the generated display screen on display device 40 (see FIG. 2). FIG. 2 is a diagram illustrating an example of order entry screen WD1 that is generated by POS system 20. As illustrated in FIG. 2, order entry screen WD1 includes order table display area WD2 and order input operation display area WD3.

Order table display area WD2 includes display area AR1 for tags (for example, "Menu", "Size", "Qty", and "Price") corresponding to the words of the speech recognition result included in the ordering customer order table list or the clerk order table list, and display area AR2 for order details corresponding to either the ordering customer order table list or the clerk order table list. Further, order table display area WD2 includes a display area indicating a settlement amount (for example, "$5.79") representative of the sum of order details, Total button Bt1 for instructing settlement, and speech recognition result display area AR3 including speech recognition result Rg1 (a first candidate for the ordering customer speech recognition result list) of the speech of the ordering customer and speech recognition result Rg2 (a first candidate for the clerk speech recognition result list) of the speech of the clerk.

Meanwhile, numeric key column button Ky1, size input key Ky2, option menu input key Ky3, and menu list and input key Ky4 are displayed on order input operation display area WD3. Numeric key column button Ky1 is a button, for example, for displaying numeric keys as a software keyboard when it is pressed. Size input key Ky2 is a button, for example, for displaying a list of types of sizes (for example, S size, R size, M Size, and L size) in a selectable pull down format when it is pressed. Option menu input key Ky3 is a button, for example, for displaying a list of option menus when it is pressed. Menu list and input key Ky4 is a button, for example, for displaying a list of all of the menus when it is pressed.

The details of ordering customer speech history button Bt2 and clerk speech history button Bt3 in speech recognition result display area AR3 will be described later with reference to FIG. 12 and FIG. 13.

Input device 30 which is an example of an operator is a user interface (UI) for outputting the details of the input operation of the clerk to POS system 20, and is, for example, a pointing device such as a mouse, a keyboard, and the like. Further, input device 30 is located, for example, corresponding to the screen of display device 40, and may be configured with a touch panel or a touch pad capable of being operated by the finger of the clerk or a stylus pen.

Display device 40 which is a display is configured with, for example, a liquid crystal display (LCD) or an organic electroluminescence (EL), and displays order entry screen WD1 which is generated by order table generator 28 under the control of POS system 20.

Memory 50 which is a storage is configured with, for example, a random access memory (RAM), functions as a work memory during the operation of each unit of POS system 20, and stores data required during the operation of each unit of POS system 20.

Figure 3:
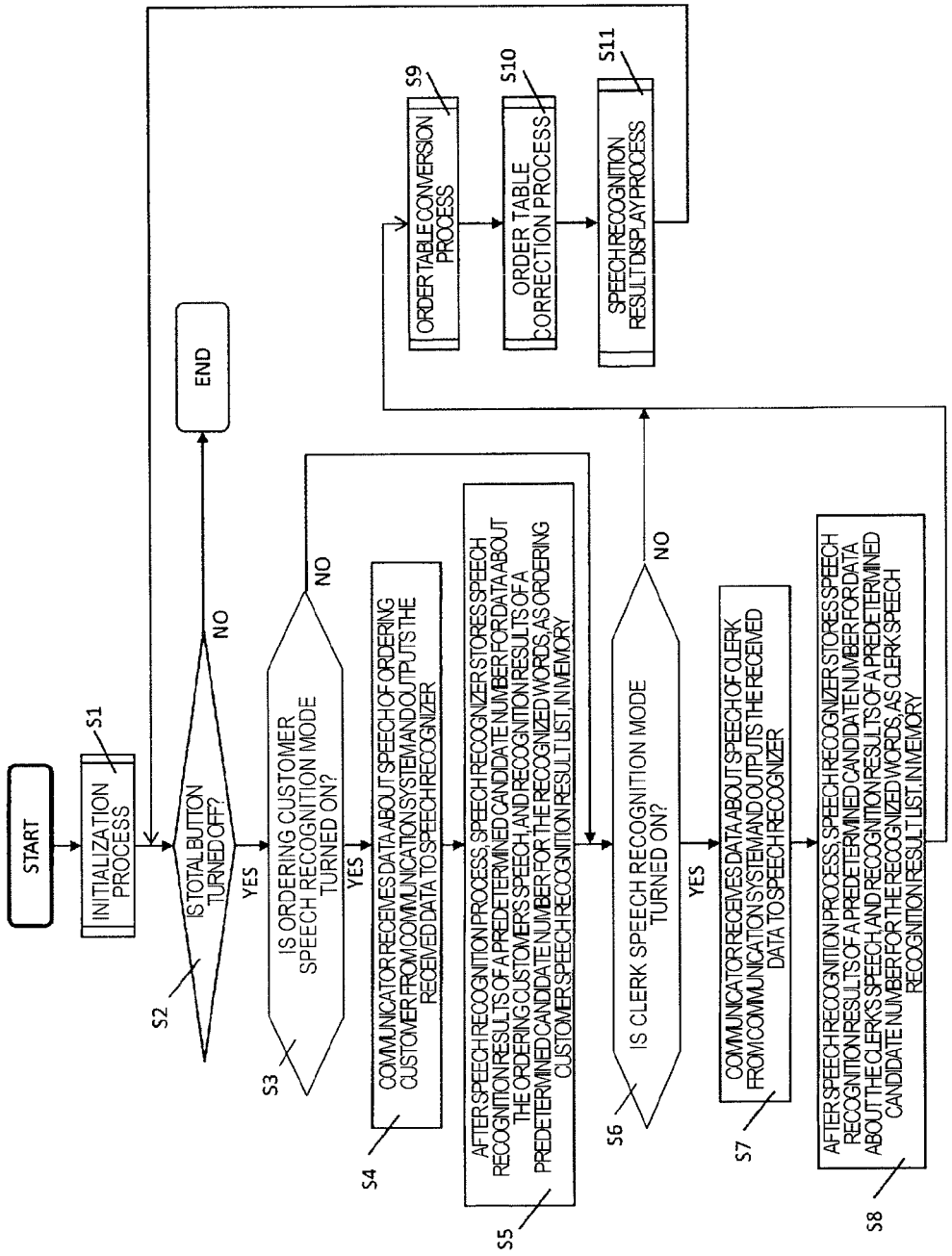
FIG. 3 is a flowchart illustrating an example of an operation procedure of a main process of the order entry system of the present exemplary embodiment.

Next, the operation procedure of a main process of order entry system 100 of the exemplary embodiment will be described with reference to FIG. 3. FIG. 3 is a flowchart illustrating an example of the operation procedure of the main process of order entry system 100 of the exemplary embodiment.

In FIG. 3, order entry system 100 first performs an initialization process (S1). The details of the initialization process of step S1 will be described later with reference to FIG. 4. After step S1, when Total button Bt2 illustrated in FIG. 2 is not turned off by the operation of the clerk (that is, when Total button Bt2 is pressed) (S2, NO), the process of order entry system 100 illustrated in FIG. 3 is ended.

Meanwhile, when Total button Bt1 illustrated in FIG. 2 is turned off by the operation of the clerk (that is, when Total button Bt1 is not pressed) (S2, YES), speech order input processor 24 determines whether or not the ordering customer speech recognition mode is turned on (S3). The ordering customer speech recognition mode is a mode indicating whether or not speech order input processor 24 performs the speech recognition process on speech of the ordering customer, and information indicating the ordering customer speech recognition mode is temporarily stored in, for example, memory 50. When it is not determined that the ordering customer speech recognition mode is turned on (S3, NO), the process of order entry system 100 illustrated in FIG. 3 proceeds to step S6.

Meanwhile, when it is determined that the ordering customer speech recognition mode is turned on (S3, YES), communicator 22 receives data about the speech of the ordering customer (ordering customer speech) from communication system 10 and outputs the received data to speech recognizer 24a (S4). Speech recognizer 24a performs the speech recognition process on the data about the ordering customer speech, and stores speech recognition results of a predetermined candidate number (for example, three) for the data about the speech of the ordering customer, and speech recognition results of a predetermined candidate number (for example, three) for the words of each speech recognition result, as the ordering customer speech recognition result list, in memory 50 (S5).

After step S5, speech order input processor 24 determines whether or not the clerk speech recognition mode is turned on (S6). The clerk speech recognition mode is a mode indicating whether or not speech order input processor 24 performs the speech recognition process on the speech of the clerk, and information indicating the clerk speech recognition mode is temporarily stored in, for example, memory 50. When it is not determined that the clerk speech recognition mode is turned on (S6, NO), the process of order entry system 100 illustrated in FIG. 3 proceeds to step S9.

Meanwhile, when it is determined that the clerk speech recognition mode is turned on (S6, YES), communicator 22 receives data about speech of the clerk (speech of the clerk) from communication system 10 and outputs the received data to speech recognizer 24a (S7). Speech recognizer 24a performs the speech recognition process on the data about the speech of the clerk, and stores speech recognition results of a predetermined candidate number (for example, three) for the data about the speech of the clerk and speech recognition results of a predetermined candidate number (for example, three) for the words of each speech recognition result, as the clerk speech recognition result list, in memory 50 (S8).

When it is not determined that the clerk speech recognition mode is turned on after step S8 or in step S6, speech order input processor 24 performs the order table conversion process (S9). The details of the order table conversion process of step S9 will be described later with reference to FIG. 6.

After step S9, speech order input processor 24 performs the order table correction process (S10). The details of the order table correction process of step S10 will be described later with reference to FIG. 9.

After step S10, speech order input processor 24 performs the speech recognition result display process (S11). The details of the speech recognition result display process of step S11 will be described later with reference to FIG. 11. After step S11, the process of order entry system 100 illustrated in FIG. 3 returns to step S2.

Figure 4:
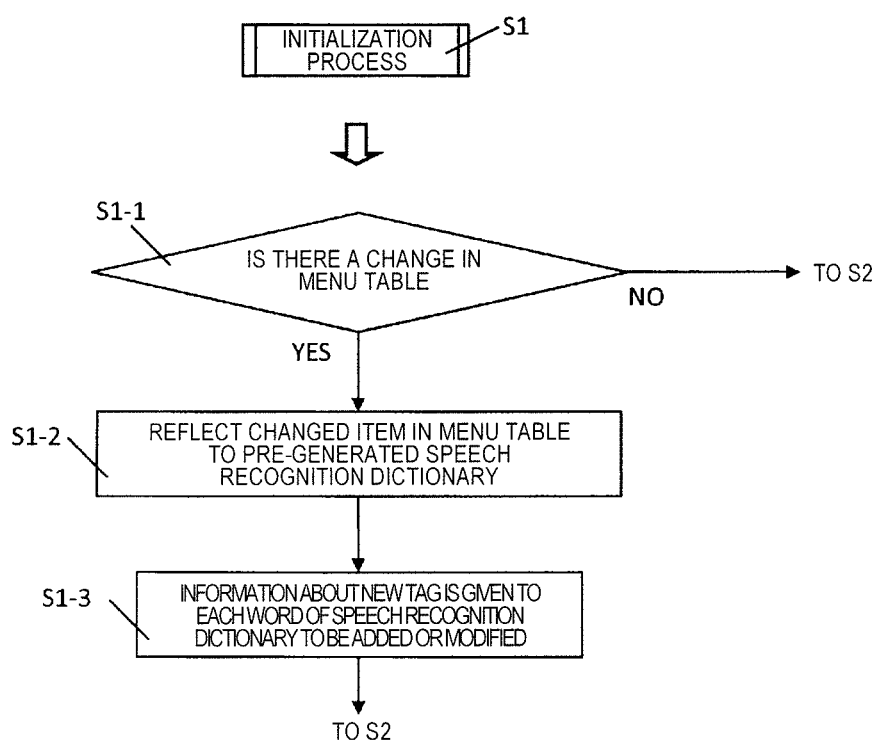
FIG. 4 is a flowchart illustrating an example of an operation procedure of an initialization process of the order entry system of the present exemplary embodiment.

Next, the details of the initialization process of order entry system 100 of the exemplary embodiment will be described with reference to FIG. 4. FIG. 4 is a flowchart illustrating an example of the operation procedure of the initialization process of order entry system 100 of the exemplary embodiment.

In FIG. 4, when there is a change in the details of the menu table of the store (S1-1, YES), speech order input processor 24 reflects and registers the details of the changed menu table that are input by the clerk's operation using input device 30 for each item in speech recognition dictionary 26 (S1-2). Further, speech order input processor 24 gives information about a new tag to each word to be added or modified by the operation illustrated in step S1-2, for example, by the clerk's operation using input device 30 (S1-3, see FIG. 5). When there is no change in the details of the menu table after step S1-3 or in step S1-1, the initialization process illustrated in FIG. 4 is ended.

Next, the details of the order table conversion process of order entry system 100 of the exemplary embodiment will be described with reference to FIG. 6. FIG. 6 is a flowchart illustrating an example of the operation procedure of the order table conversion process of order entry system 100 of the exemplary embodiment.

In FIG. 6, order table converter 24b determines whether or not the ordering customer speech recognition mode is turned on, by referring to information indicating the ordering customer speech recognition mode stored in memory 50 (S9-1). When it is determined that the ordering customer speech recognition mode is turned on (S9-1, YES), order table converter 24b extracts a first candidate for the recognition result of the speech of the ordering customer from the ordering customer speech recognition result list, and generates the ordering customer order table list, based on the information about the tag of each word included in the first candidate (see S9-2, FIG. 7).

Meanwhile, when it is not determined that the ordering customer speech recognition mode is turned on (S9-1, NO), the order table conversion process illustrated in FIG. 6 proceeds to step S9-3.

After step S9-2, order table converter 24b determines whether or not the clerk speech recognition mode is turned on, by referring to information indicating the clerk speech recognition mode stored in memory 50 (S9-3). When it is determined that the clerk speech recognition mode is turned on (S9-3, YES), order table converter 24b extracts a first candidate for the recognition result for the speech of the clerk from the clerk speech recognition result list, and generates the clerk order table list, based on the information about the tag of each word included in the first candidate (see S9-4, FIG. 7).

Meanwhile, when it is not determined that the clerk speech recognition mode is turned on (S9-3, NO), the order table conversion process illustrated in FIG. 6 proceeds to step S9-7.

Figure 14:
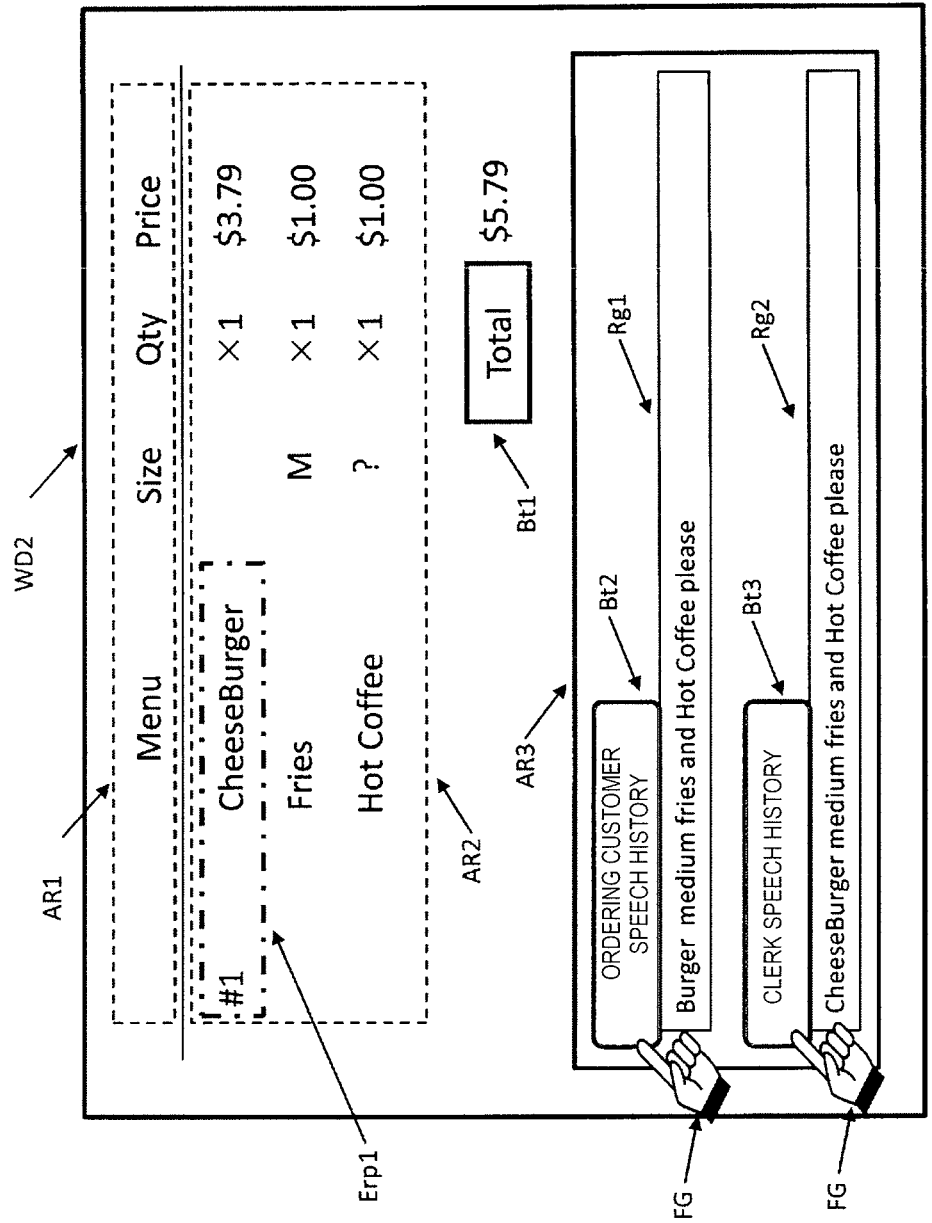
FIG. 14 is an explanatory diagram illustrating an example in which an item having a mismatch between the ordering customer order list and the clerk order list is highlighted and displayed.

After step S9-4, when the ordering customer order table list is generated in step S9-2, and there is a mismatching portion from a result of comparing the ordering customer order table list with the clerk order table list generated in step S9-4, order table converter 24b highlights and displays the mismatching portion (see S9-5, FIG. 14). When there is no mismatching portion, or when it is not determined that the ordering customer speech recognition mode is turned on in step S9-1, order table converter 24b may be configured to omit the process of step S9-5.

FIG. 14 is an explanatory diagram illustrating a case of highlighting and displaying an item that is mismatched between the ordering customer order list and the clerk order list. In FIG. 14, the first candidate for the recognition result for the speech of the ordering customer is "Burger medium fries and Hot Coffee please", and the first candidate for the recognition result for the speech of the clerk is "CheeseBurger medium fries and Hot Coffee please", as described in step S9-6, the first candidate for the recognition result for the speech of the clerk is preferred to the first candidate for the speech recognition result for the ordering customer speech, and the details of the clerk order table list is displayed on display area AR2 of order details.

When there is a mismatching portion between the ordering customer order table list and the clerk order table list, as illustrated in FIG. 14, order table converter 24b highlights and displays mismatch portion Erp1. For example, order table converter 24b may display mismatch portion Erp1 by painting it with a predetermined color, or display it by blinking (flashing).

After step S9-5, order table converter 24b displays the details of the clerk order table list generated in step S9-4, in display area AR2 for order details of order table display area WD2 of order entry screen WD1 (S9-6). In particular, even if the ordering customer order table list is generated in step S9-2, order table converter 24b displays the details of the clerk order table list in display area AR2 for order details, with the clerk order table list being preferred to the ordering customer order table list.

Meanwhile, when it is not determined that the clerk speech recognition mode is turned on (S9-3, NO), if the ordering customer order table list is generated in step S9-2, order table converter 24b displays the details of the ordering customer order table list in display area AR2 for order details of order table display area WD2 of order entry screen WD1 (S9-7). When the ordering customer order table list is not generated in step S9-2, order table converter 24b may be configured to display empty details in which data about the ordering customer order table list and the clerk order table list is empty, in display area AR2 for order details of order table display area WD2 of order entry screen WD1.

Figure 9:
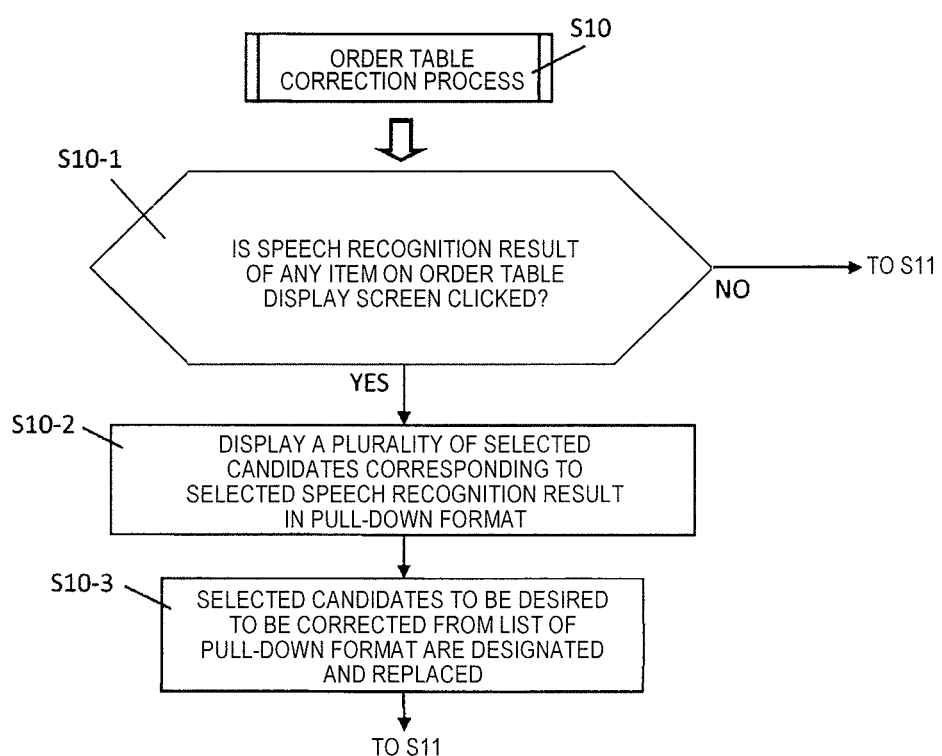
FIG. 9 is a flowchart illustrating an example of an operation procedure of an order table correction process of the order entry system of the present exemplary embodiment.

After step S9-6 or step S9-7, the order table conversion process illustrated in FIG. 9 is ended.

Next, the details of the order table correction process of order entry system 100 of the exemplary embodiment will be described with reference to FIG. 8A to FIG. 8C, and FIG. 9. FIG. 8A to FIG. 8C are explanatory diagrams illustrating an example of modification of order details for each item of the ordering customer order table list or the clerk order table list. FIG. 9 is a flowchart illustrating an example of the operation procedure of the order table correction process of order entry system 100 of the exemplary embodiment.

In FIG. 9, order table converter 24b determines whether or not the speech recognition result of any item in display area AR2 for order details of order table display area WD2 is touched (clicking is also available, hereinafter the same), by the clerk's operation using input device 30 (S10-1). When it is determined that the speech recognition result of any item in display area AR2 for order details of order table display area WD2 is touched (S10-1, YES), order table converter 24b lists and displays a plurality of selected candidates corresponding to the speech recognition result selected by clicking on the periphery of the selected speech recognition result (see S10-2, FIG. 8A to FIG. 8C).

For example, as illustrated in FIG. 8A, when the word in display area AR2 for order details "CheeseBurger" is touched by the clerk's finger FG, order table converter 24b lists and displays the word "CheeseBurger", the word "Hamburger", and the word "Cheese" of which tag information is "Menu", as a plurality of selected candidates corresponding to the word "CheeseBurger" of which tag information is "Menu", on the periphery of the touched word "CheeseBurger".

Further, for example, as illustrated in FIG. 8B, when the word "?" in display area AR2 for order details is touched by the clerk's finger FG, order table converter 24b lists and displays the word "1", the word "2", the word "3", the word "4", and the word "5" of which tag information is "Qty" as a plurality of selected candidates corresponding to the word "?" of which tag information is "Qty", on the periphery of the touched word "?".

Further, for example, as illustrated in FIG. 8C, when the word "M" in display area AR2 for order details is touched by the clerk's finger FG, order table converter 24b lists and displays the word "S", the word "R", the word "M", and the word "L" of which tag information is "Size" as a plurality of selected candidates corresponding to the word "M" of which tag information is "Size", on the periphery of the touched word "M".

After step S10-2, when a certain word is designated from among a plurality of selected candidates displayed in a pull-down format in step S10-2, order table converter 24b replaces the word selected in step S10-1 with the word that is designated from among the plurality of selected candidates displayed in the pull-down format (S10-3).

Figure 10:
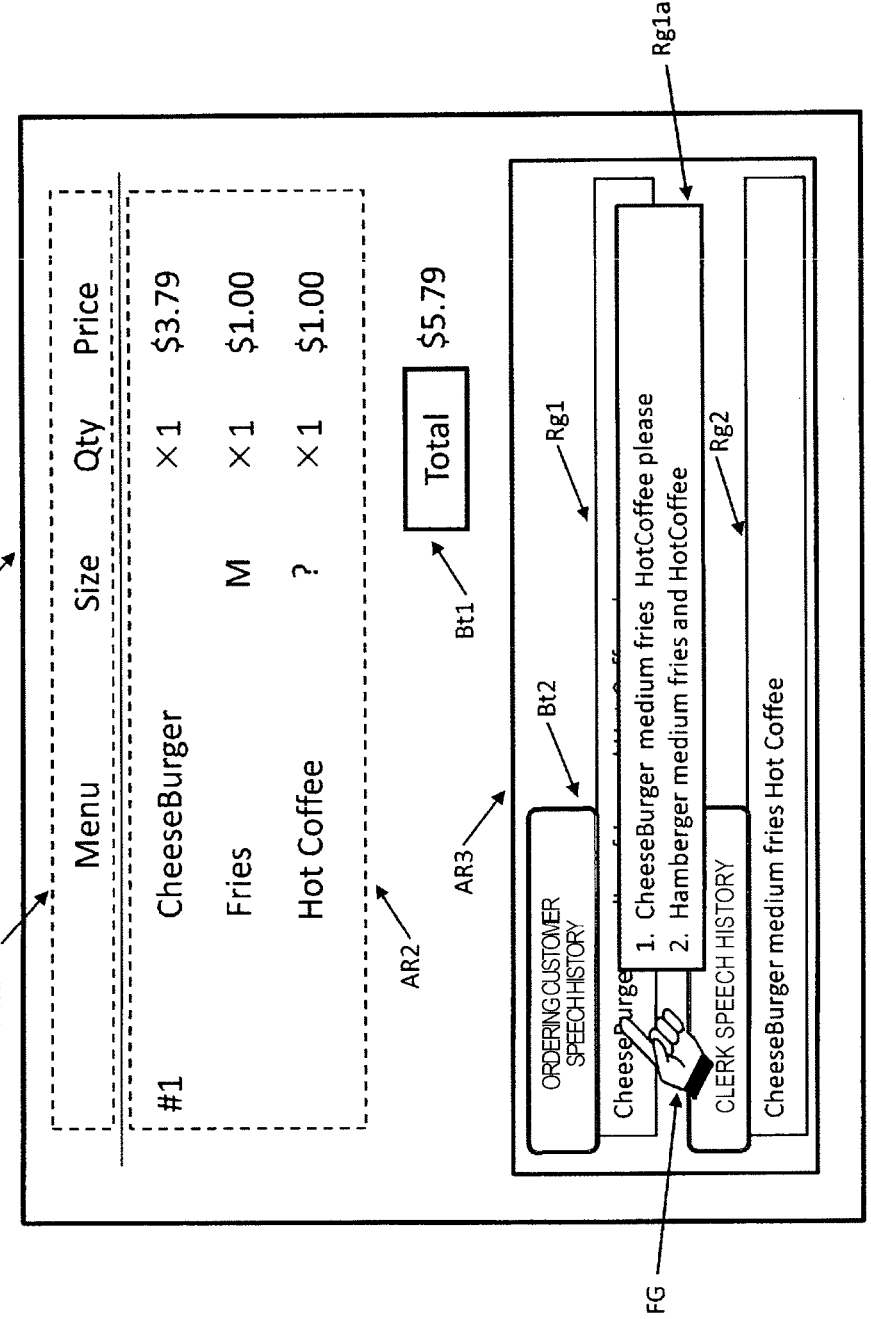
FIG. 10 is an explanatory diagram illustrating a display example of other candidates for a recognition result of speech about an order of an ordering customer in response to a selection operation for an ordering customer speech history.
Figure 11:
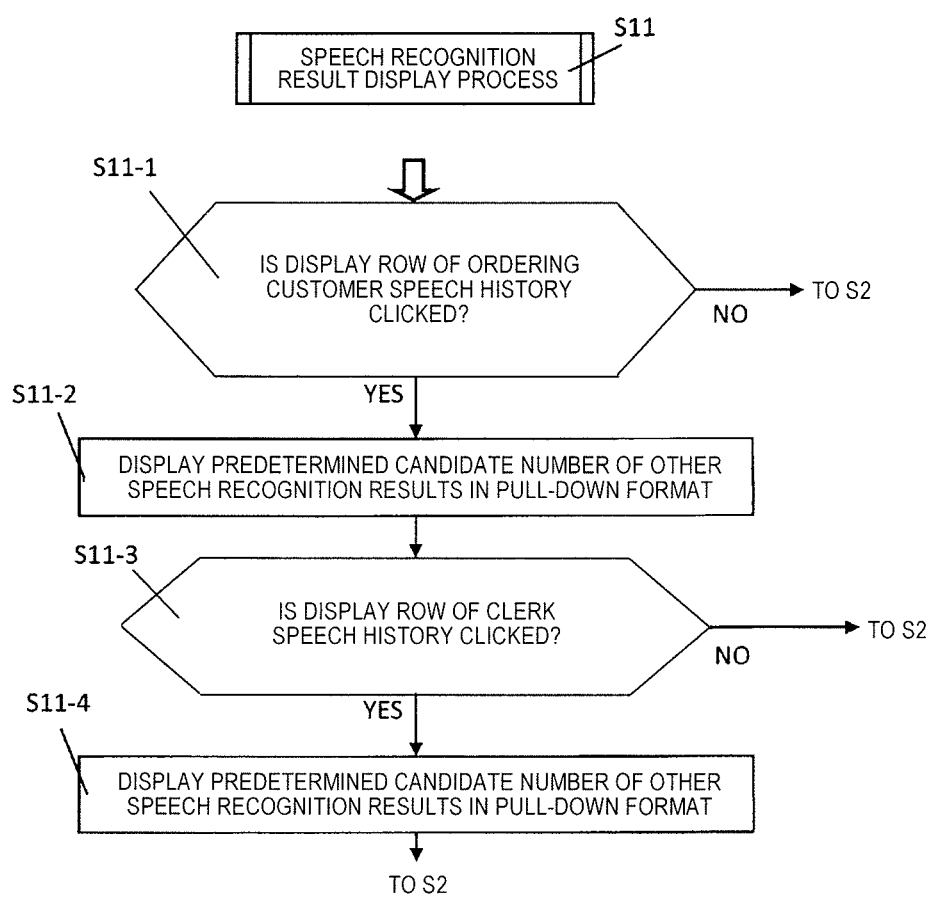
FIG. 11 is a flowchart illustrating an example of an operation procedure of a speech recognition result display process of the order entry system of the present exemplary embodiment.

Next, the speech recognition result display process of order entry system 100 of the exemplary embodiment will be described with reference to FIG. 10 and FIG. 11. FIG. 10 is an explanatory diagram illustrating a display example of other candidates for the recognition result of the speech about an order of the ordering customer in response to the selection operation of the ordering customer speech history. FIG. 11 is a flowchart illustrating an example of the operation procedure of the speech recognition result display process of order entry system 100 of the exemplary embodiment. As an assumption of the description of FIG. 11, it is assumed that the first candidate (speech recognition result Rg1) for the ordering customer speech recognition result list is displayed in the ordering customer's speech history, and the first candidate (speech recognition result Rg2) for the clerk speech recognition result list is displayed in the speech history of the clerk.

In FIG. 11, when the display row of speech recognition result Rg1 of the ordering customer speech history is clicked (S11-1, YES), order table converter 24b displays a predetermined candidate number of (for example, a plurality of) other speech recognition results Rg1a of speech recognition result Rg1 in a pull-down format, on the periphery of the clicked speech recognition result Rg1 (see S11-2. FIG. 10).

For example, in FIG. 10, order table converter 24b displays "CheeseBurger, medium fries, Hot Coffee please" and "Hamburger, medium fries and HotCoffee" as a predetermined candidate number of other speech recognition results Rg1a for "CheeseBurger, medium fries and Hot Coffee please", on the periphery of "CheeseBurger, medium fries and HotCoffee please" which is clicked.

After step S11-2, when the display row of the speech recognition result Rg2 of the clerk speech history is clicked (S11-3, YES), order table converter 24b displays a predetermined candidate number of (for example, a plurality of) other speech recognition results of the speech recognition result Rg2 in a pull-down format, on the periphery of the clicked speech recognition result Rg2 (S11-4).

When the display row of speech recognition result Rg1 of the ordering customer speech history is not clicked in step S11-1, and the display row of the speech recognition result Rg2 of the clerk speech history is not clicked in step S11-3, or after step S11-4, the speech recognition result display process illustrated in FIG. 11 is ended.

Next, switching on and off of the ordering customer speech recognition mode and the clerk speech recognition mode in order entry system 100 of the exemplary embodiment will be described with reference to FIG. 12 and FIG. 13. FIG. 12 is an explanatory diagram illustrating switching on and off of the ordering customer speech recognition mode and the clerk speech recognition mode. FIG. 13 is a flowchart describing switching on and off of the ordering customer speech recognition mode and the clerk speech recognition mode in order entry system 100 of the exemplary embodiment.

Figure 12:
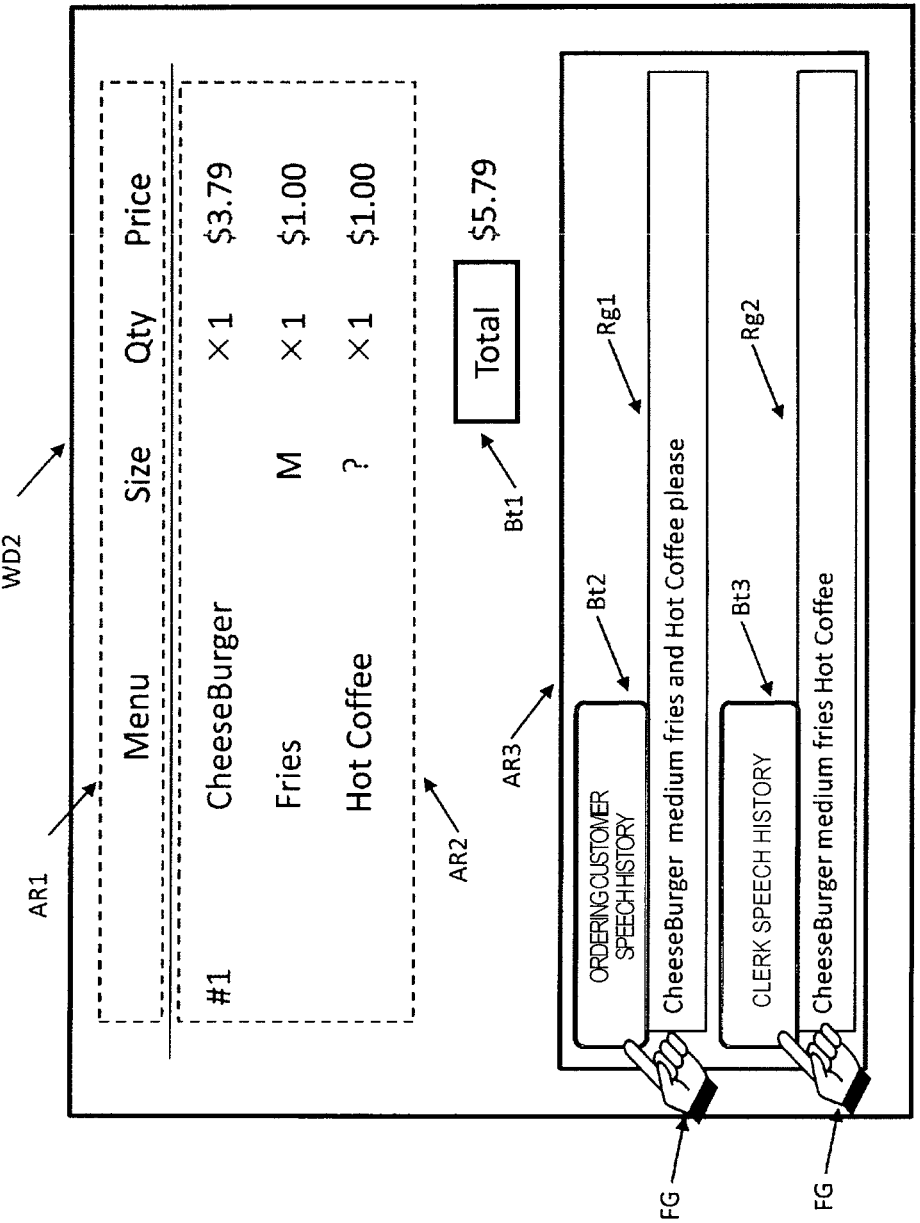
FIG. 12 is an explanatory diagram illustrating switching on and off between an ordering customer speech recognition mode and a clerk speech recognition mode.
Figure 13:
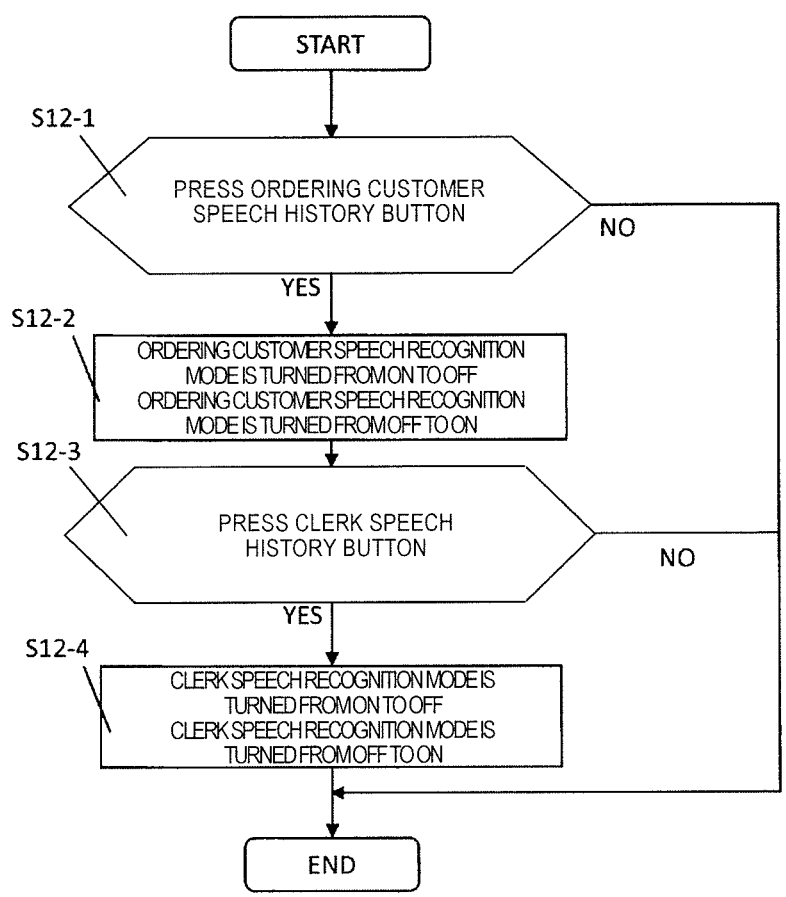
FIG. 13 is a flowchart illustrating switching on and off between the ordering customer speech recognition mode and the clerk speech recognition mode of the order entry system of the present exemplary embodiment.

In FIG. 13, when ordering customer speech history button Bt2 illustrated in FIG. 12 is clicked once (touching is also available, hereinafter the same) (S12-1, YES), if the ordering customer speech recognition mode is turned on, speech order input processor 24 switches the mode off; and if the ordering customer speech recognition mode is turned off, it switches the mode on (S12-2).

After step S12-2, when clerk speech history button Bt3 illustrated in FIG. 12 is clicked once (S12-3, YES), if the clerk speech recognition mode is 'ON", speech order input processor 24 switches the mode off; and if the clerk speech recognition mode is turned off, it switches the mode on (S12-4).

In other words, as illustrated in FIG. 12, for example, whenever ordering customer speech history button Bt2 or clerk speech history button Bt3 is pressed by the clerk's finger FG, the ordering customer speech recognition mode and the clerk speech recognition mode are switched on and off alternately, as a toggle switch.

A stop button and a resume button of the ordering customer speech recognition mode or the clerk speech recognition mode are displayed on order table display screen WD2, and speech order input processor 24 may switch on and off in response to the number of times each button is pressed (for example, if an odd number of times, switching-on; and if an even number of times, switching-off). Further, rather than the operation on order table display screen WD2, a stop button and a resume button of the ordering customer speech recognition mode or the clerk speech recognition mode may be provided in headset Hds that the clerk wears, which allows the clerk to easily perform switching.

As described above, order entry system 100 of the exemplary embodiment recognizes speech about the order details of the ordering customer and speech (reciting speech) about the order details of the clerk for checking the order details of the ordering customer, and displays order entry screen WD1 (the display screen of the order data) regarding the order details of the ordering customer, including speech recognition result Rg1 of speech about the order details of the ordering customer and speech recognition result Rg2 of speech about the order details of the clerk, on display device 40.

Thus, since order entry system 100 displays order entry screen WD1 regarding the order details of the ordering customer using two types of speech: speech of the ordering customer at the time of an order, and speech in which a clerk repeats the customer's speech at the time of the order, in a noisy environment such as a drive-through, on display device 40, it is possible to reduce the frequency at which the details of the order data is incorrect, allow the clerk to efficiently input the order details, and easily check the input of the order details even if the clerk is inexperienced in the business.

Further, since order entry system 100 generates order entry screen WD1 regarding the order details of the ordering customer, with speech recognition result Rg2 of the clerk being preferred to speech recognition result Rg1 of the ordering customer, out of speech recognition result Rg1 of the ordering customer and speech recognition result Rg2 of the clerk, it is possible to reduce the frequency at which the details of order entry screen WD1 are incorrect, taking into account that the speech in which the clerk repeats the details of the speech of the ordering customer is more accurate than the speech of the ordering customer in the speech recognition result.

Further, since order entry system 100 stops or resumes the speech recognition process of the speech about the order details of the ordering customer or the clerk, in response to a predetermined selection operation performed on order entry screen WD1 displayed on display device 40, this can facilitate the switching between stopping and resuming of the speech recognition process of the speech about the order details of the ordering customer or the clerk, and thus for example, it is possible to properly stop or resume the speech recognition of the speech of the clerk so as not to recognize speech other than the order details, when the clerk repeats the order details.

Further, when speech recognition result Rg1 of the ordering customer and speech recognition result Rg2 of the clerk mismatch each other, order entry system 100 highlights and displays the mismatching portion in order entry screen WD1 regarding the order details of the ordering customer, such that it is possible to cause the clerk to easily recognize the mismatching portion in order entry screen WD1 regarding the order details of the ordering customer, and modify the mismatching portion to correct order details.

Further, since order entry system 100 displays a plurality of candidates for the speech recognition result other than speech recognition result Rg1 of the ordering customer or speech recognition result Rg2 of the clerk, on the periphery of speech recognition result Rg1 of the ordering customer or speech recognition result Rg2 of the clerk, in response to a predetermined selection operation performed on order entry screen WD1 displayed on display device 40, even if speech recognition result Rg1 of the ordering customer or speech recognition result Rg2 of the clerk mismatch each other, it is possible to easily modify speech recognition result Rg1 of the ordering customer or speech recognition result Rg2 of the clerk; and even if the ordering customer quickly speaks the order details or speaks a lot of order details, the clerk can refer appropriately to the speech recognition results instead of notes or for checking of, for example, terms (words) susceptible to false recognition, such that it is possible to improve the convenience in operations of the clerk.

Further, since order entry system 100 displays a plurality of selected candidates other than the recognition result of the speech of the ordering customer (for example, words. Hereinafter, the same) or the recognition result of the speech of the clerk (for example, words. Hereinafter, the same), for the order details of each item, in response to a predetermined selection operation for the order details for each predetermined item, performed on order entry screen WD1 displayed on display device 40, on the periphery of the recognition result of the speech of the ordering customer or the recognition result of the speech of the clerk, it is possible to easily select and modify the recognition result of the speech of the ordering customer or the recognition result of the speech of the clerk, for the order details of each item on order entry screen WD1 among a plurality of other selected candidates.

Hitherto, various exemplary embodiments have been described with reference to the drawings, but the present disclosure is not limited to the exemplary embodiments. It would be apparent that those skilled in the art can conceive various modification examples within the scope described in the claims and it is naturally understood that those belong to the technical scope of the present disclosure.

The present disclosure is useful as an order entry system and an order entry method, each of which facilitates an input of order details, by using two types of speech: speech of the ordering customer at the time of an order, and speech in which the clerk repeats the speech of the ordering customer at the time of the order, in a noisy environment such as a drive-through.

What is claimed is:

1. An order entry system that supports and improves accuracy of order entry in a POS system, the order entry system comprising:
   a first microphone that is installed outdoors and picks up first speech, regarding order details, of a first person;
   a speaker that is installed indoors and outputs the first speech, regarding the order details, of the first person picked up by the first microphone;
   a second microphone that is installed indoors and picks up second speech, regarding the order details, of a second person, the second speech confirming the first speech, regarding the order details, of the first person, output by the speaker;
   a processor that recognizes the first speech, regarding the order details, of the first person, which is picked up by the first microphone, and the second speech, regarding the order details, of the second person, which is picked up by the second microphone, the second speech confirming the first speech, regarding the order details, of the first person, output by the speaker; and
   the processor displays, on a display that is installed indoors, a display screen of order data regarding the order details of the first person, the display screen including a first speech recognition result of the first speech, regarding the order details, of the first person, and a second speech recognition result of the second speech, regarding the order details, of the second person, the second speech confirming the first speech, regarding the order details, of the first person output by the speaker.

2. The order entry system of claim 1,
   wherein the processor generates the order data regarding the order details of the first person, with the second speech recognition result being preferred to the first speech recognition result.

3. The order entry system of claim 1,
   wherein the processor stops or resumes a speech recognition process of the first speech, regarding the order details, of the first person or the second speech, regarding the order details, of the second person, in response to a selection operation performed on the display screen of the order data displayed on the display.

4. The order entry system of claim 1,
   wherein, when the processor compares the first speech recognition result and the second speech recognition result, and the first speech recognition result does not match the second speech recognition result, the processor highlights and displays a mismatching portion on the display screen of the order data regarding the order details of the first person.

5. The order entry system of claim 1,
   wherein the processor displays a plurality of speech recognition result candidates other than the first speech recognition result and the second speech recognition result, on a periphery of the first speech recognition result or the second speech recognition result, in response to a selection operation performed on the display screen of the order data displayed on the display.

6. The order entry system of claim 1,
   wherein the processor displays a plurality of selection candidates other than the first speech recognition result and the second speech recognition result of the order details for each item, on the periphery of the first speech recognition result or the second speech recognition result, in response to a selection operation for the order details for each item on the display screen of the order data displayed on the display.

7. The order entry system of claim 1, wherein the display screen further includes an order list generated from the first speech recognition result or the second speech recognition result.

8. The order entry system of claim 1, wherein the second speech, regarding the order details, of the second person, is made by the second person repeating the first speech, regarding the order details, of the first person, output by the speaker.

9. An order entry method that supports and improves accuracy of order entry in a POS system including a first microphone that is installed outdoors, a speaker that is installed indoors, a second microphone that is installed indoors and a display that is installed indoors, the method comprising:

picking up, by the first microphone, first speech, regarding order details, of a first person;

outputting, by the speaker, the first speech, regarding the order details, of the first person picked up by the first microphone;

picking up, by the second microphone, second speech, regarding the order details, of a second person, the second speech confirming the first speech, regarding the order details, of the first person, output by the speaker;

recognizing the first speech, regarding the order details, of the first person, which is picked up by the first microphone, and the second speech, regarding the order details, of the second person, which is picked up by the second microphone, the second speech confirming the first speech, regarding the order details, of the first person, output by the speaker; and displaying, on a display, a display screen of order data regarding the order details of the first person, the display screen including a first speech recognition result of the speech, regarding the order details, of the first person, and a second speech recognition result of the second speech, regarding the order details, of the second person, the second speech confirming the first speech, regarding the order details, of the first person, output by the speaker.

* * * * *